July 25, 1961 T. EDMONDS ET AL 2,994,041

KLYSTRON OSCILLATOR CONTROL CIRCUIT

Filed Dec. 17, 1953 3 Sheets-Sheet 1

INVENTORS:
THEODORE EDMONDS
SANDFORD C. PEEK, JR.
BY Laurence Burns
ATTORNEY.

July 25, 1961 T. EDMONDS ET AL 2,994,041

KLYSTRON OSCILLATOR CONTROL CIRCUIT

Filed Dec. 17, 1953 3 Sheets-Sheet 2

THEODORE EDMONDS,
SANDFORD C. PEEK, JR.
INVENTORS.

BY [signature]
ATTORNEY.

July 25, 1961 T. EDMONDS ET AL 2,994,041

KLYSTRON OSCILLATOR CONTROL CIRCUIT

Filed Dec. 17, 1953 3 Sheets-Sheet 3

THEODORE EDMONDS,
SANDFORD C. PEEK, JR.
INVENTORS

BY Lawrence Burns,
ATTORNEY.

United States Patent Office 2,994,041
Patented July 25, 1961

2,994,041

KLYSTRON OSCILLATOR CONTROL CIRCUIT

Theodore Edmonds, Salem, and Sandford C. Peek, Jr., Hamilton, Mass., assignors, by mesne assignments, to Sylvania Electric Products Inc., Wilmington, Del., a corporation of Delaware Filed Dec. 17, 1953, Ser. No. 398,701
4 Claims. (Cl. 331—7)

This invention relates to microwave equipment using a klystron oscillator tube and in particular to such equipment in which the frequency of the klystron output and the reflector voltage operating point of the tube are to be kept within narrow limits.

Such equipment is especially useful in microwave transmitters and receivers, and in repeater stations at which a signal of a given frequency range is received and a signal of slightly different frequency range is emitted. In the latter devices, a reflex klystron oscillator is used having a frequency many megacycles above or below that of the received signal. The beat frequency between the tube and the received signal is detected and passed to an intermediate frequency amplifier from which it is then fed as a modulating signal to the same klystron through a discriminator. The major portion of the klystron output is fed to an antenna and radiated therefrom, with only a small portion of the klystron output being fed back to the receiver to heterodyne the incoming signal.

Within narrow limits, the difference between the received signal frequency and klystron frequency must be kept substantially constant. The heterodyne detector and the discriminator act to keep the frequency difference constant if the device is used as a repeater. When the device is used merely as a transmitter, the mean klystron frequency itself must be kept constant since there is no received signal with which to compare it. This frequency control is achieved by a radio frequency discriminator in the output circuit of the klystron, with a low-pass filter to keep out the modulation, and the discriminator's D.C. output in series with the klystron reflector voltage.

However, while such means keep the frequency or frequency difference constant, they do so only by allowing the klystron to shift its operating point to a position off the center of the mode and onto the non-linear portion of the frequency vs. reflector-voltage characteristic, if the station is used only as a transmitter, or at a substantially constant difference in frequency from the received signal, if the station is a repeater, thereby reducing the power output and causing non-linear frequency modulation.

The present invention enables both the frequency and the reflector operating point to be kept within narrow limits and thereby keeps the klystron on the linear portion of its frequency-voltage characteristic with its output high.

This is accomplished by varying the spacing between two klystron grids by means of a thermal control actuated by an input dependent on the amount by which the klystron reflector voltage has shifted from its proper operating point.

The expansion and contraction of a member controlling the spacing between the grids is effected by a heater to which is applied a voltage or current differential dependent on the amount of shift in the tube's operating characteristics.

In the usual klystron tube, one radio frequency grid of a pair is fixed, and the other mounted on an adjustable diaphragm, which is movable mechanically with respect to the fixed grid by turning an adjustment screw. This required the presence of an operator and was unsatisfactory and awkward. In the present embodiment, the klystron is made to adjust itself automatically, without the presence of an operator.

In one embodiment, in which automatic control is used to maintain the frequency constant, or at a constant difference from the received frequency, by changing the reflector voltage, the controlling voltage differential to bring the reflector voltage back to normal is fed to the grid-cathode circuit of a vacuum tube, which has the control winding of a saturable choke in its plate-cathode circuit. Another winding on the choke is connected in series with both an alternating voltage supply and the heating winding of the thermal control for the klystron grid. The voltage applied to the grid-cathode circuit of the vacuum tube is made proportional to the change in reflector voltage of the klystron, and causes a change in the direct current through the control windings of the choke in the plate-cathode circuit, thereby changing the impedance of the other winding on the choke and varying the heating current through the thermal control for the grid.

In another embodiment, the variation in the grid position produced by the thermal control is itself used to keep the frequency constant, through a radio-frequency discriminator, and the reflector operating point of the klystron then kept fixed by other means, for example, by a voltage regulator on the reflector voltage.

Further objects, advantages and features of the invention will be clear from the following specification, in which.

Figures 1, 2:
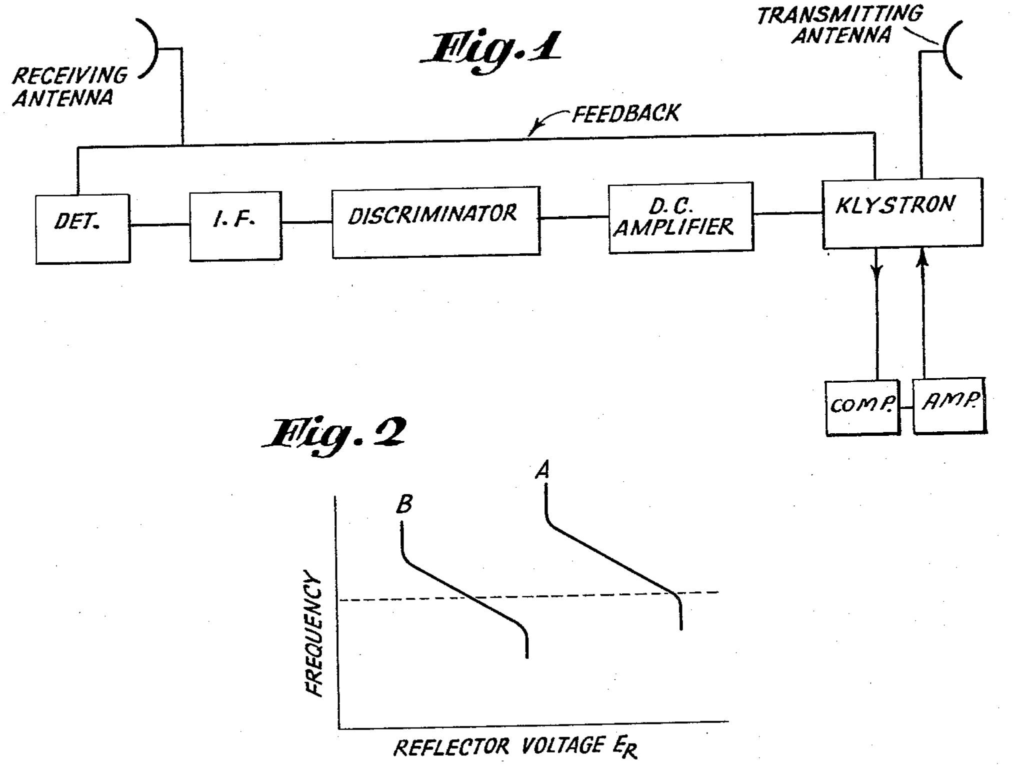
FIGURE 1 is a block diagram of one embodiment of the invention.
FIGURE 2 is a graph of klystron frequency versus reflector voltage.

In FIGURE 1, an antenna is shown connected to a detector, I.F. (Intermediate Frequency) amplifier, discriminator, D.C. (Direct Current) amplifier, klystron, compensator and another antenna. One antenna receives the signal from one direction, and the other transmits it in a different direction. For example, one antenna may receive the signal from the east and the other transmit it to the west. The antennae are directional.

The incoming signal is mixed with the klystron oscillation, the latter being of a frequency differing from that of the signal, for example, by 90 megacycles, and thereby producing a beat frequency of that difference, which is detected by the detector in the usual manner. The detected signal is then amplified by the I.F. amplifier and fed into a discriminator. The output of the latter, is amplified by a D.C. amplifier and added in series to a regulated reflector voltage power supply which in turn modulates the frequency of the klystron in the usual manner. The modulated output from the klystron is then fed to the transmitting antenna, from which it is radiated.

A small part of the klystron output is fed back to the first detector, to heterodyne the incoming signal, as already described. The connection from the klystron to the detector unit is made through a feedback line including the proper attenuation. A change in the incoming frequency, due to either a signal or a drift in the transmitted frequency which the antenna is receiving, will then cause a change in the detected intermediate frequency, which will act through the discriminator to change the reflector voltage of the klystron, thereby changing the klystron frequency by the amount of change in the received frequency. The emitted frequency will then always be a predetermined amount, for example 90 megacycles, different from the received frequency.

When there is no received signal, for example when the device is used merely as a transmitter, a radio frequency (R.F.) distriminator is used between the klystron and the D.C. amplifier to maintain the center or unmodulated frequency constant, by varying the reflector voltage. A low-pass filter is used in series with the R.F. discriminator output, to pass only the long term change in mean D.C. level, and exclude the more rapid variations due to modulation.

The arrangements described above keep the frequency or frequency difference constant, but do so by changing the reflector voltage, thereby shifting the operating point of the tube to a different portion of the characteristic curve of frequency vs. reflector-voltage, and the center of the operating range will no longer be at the center of the linear portion of the curve. The characteristic will be as shown in curve A of FIG. 2, whereas the desired position for it will be that shown by curve B.

Figure 3:
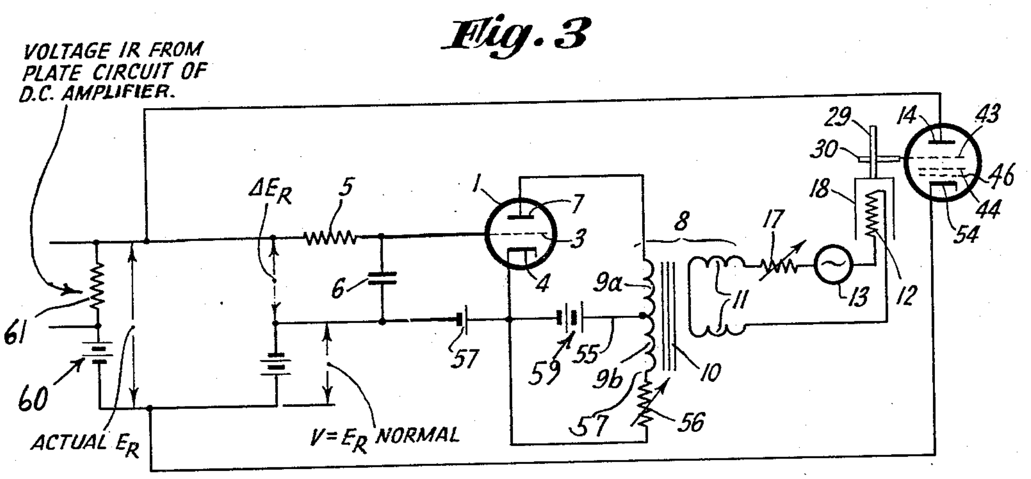
FIGURE 3 is a circuit diagram of the portion of the device which receives the change in reflector voltage and translates it into a change in the heating current of the thermal control.

To change the characteristic back to position B, use is made of the amount $\Delta E_R$ by which the mean level of reflector voltage $E_R$ has changed from its value on the center of curve B, that value being herein called the proper operating point. As shown in FIG. 3, the actual mean reflector voltage $E_R$, that is its value on curve A, the voltage between the klystron reflector 14 and klystron cathode 54, is fed to the input circuit of an amplifier tube 1 in series with a battery 60 having a constant voltage drop equal to the normal mean reflector voltage $E_R$ for curve B, but of opposite polarity. The difference between these two is $\Delta E_R$, which is applied to the input circuit of a vacuum tube. That is, the voltage $\Delta E_R$, is applied between the grid 3 and cathode 4 of vacuum tube 1, with a high resistance 5 of say 5 megohms, in series, and a capacity 6 of say 0.5 microfarad between the grid 3 and cathode 4. The condenser-resistance arrangement 5, 6, is used to give a long time constant, thereby preventing fluctuations of small time constant, such as those due to the modulation, from affecting the amplifier. Thus the condenser and resistance act as a filter to pass only the mean D.C. level.

The tube 1 is biased by the battery 57 to insure operation over the linear portion of its grid-voltage plate-current characteristic, and the output circuit between the plate 7 and cathode 4 contains the control winding 9*a* of the saturable reactor 8, which therefore receives direct current due to the rectified signal.

The control winding of the saturable reactor 8 is divided into two parts by the center tap 55, which is connected to the positive terminal of the plate voltage supply 59. Current thus flows through coils 9*a* and 9*b* in opposite directions, the magnetizing effect of one coil on the core being neutralized in whole or in part by the effect of the other. The variable resistance 56, connected to the cathode 4 can be adjusted so that the current through coil 9*a* is sufficient, with the plate current flowing through coil 9*a*, to fix the flux density in core 10 at a predetermined value. Any increase or decrease in $\Delta E_R$ will then cause a change in the direct current through winding 9*a*, thereby changing the flux density in the iron core 10 of the choke and hence varying the reactance of the other windings 11, 11 because of the change in permeability accompanying the change in flux density. The variation in impedance of the choke windings 11 changes the current in the output circuit, that is the current through the heater 12, which is supplied to it by a source 13 of A.C. voltage through an adjustable resistance 17 and the windings 11 of the saturable reactor. The voltage source 13 can also be filament voltage source for the vacuum tube 1, because low voltage is convenient.

The heater 12 is set in the metal cup 18, which expands when heated, thereby moving the klystron adjustment screw 29, which rests on top of it, and the chamber 30 attached to said screw. The klystron grid 43 and reflector 14 move with the chamber 30, but the grid 44, together with the accelerating grid 46 and cathode 54 remain fixed. The spacing between the two radio frequency grids 43 and 44 is thus varied. If the current through heater 12 in normal operation is sufficient to keep the grid spacing at the center of its range, then the grid spacing will increase or decrease as the reflector voltage rises or falls.

Figure 4:
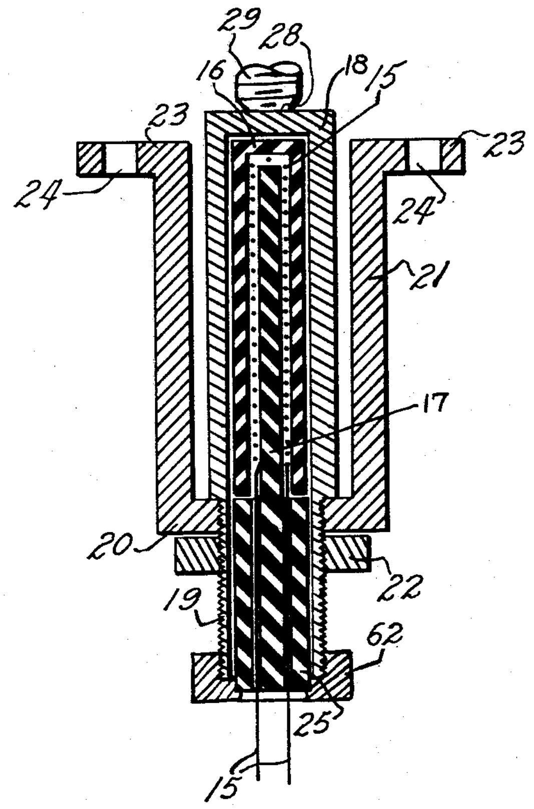
FIGURE 4 is a sectional view of the compensator with its thermal control.

The heater 12 is part of the compensator unit shown in more detail in FIGURE 4. The Nichrome heater wire 15 is coiled into a reverse-coil as is customary in vacuum tube heaters, and is inserted into the lava spacing cup 16, the lava spindle 17 being inserted as a core for the coil and as a closure means for the bottom of the cup 16. The latter and the spindle 17, with the heater wire 15 thereon, are inserted in a metal cylinder 18, the latter having screw-threads 19 at its open end and being screwed into the bottom 20 of the bracket 21 and held firmly in place, by a locknut 22. The top 23 of the bracket 21 has holes 24 through which it may be firmly attached to a klystron by screws. The closed top of the metal compensator cylinder 18 extends somewhat above the top of the supporting bracket 23. A cap 62 fits over the end of the cylinder 18, holding the lava spindle 17 in place, by acting on its enlarged bottom portion 25.

Figure 5:
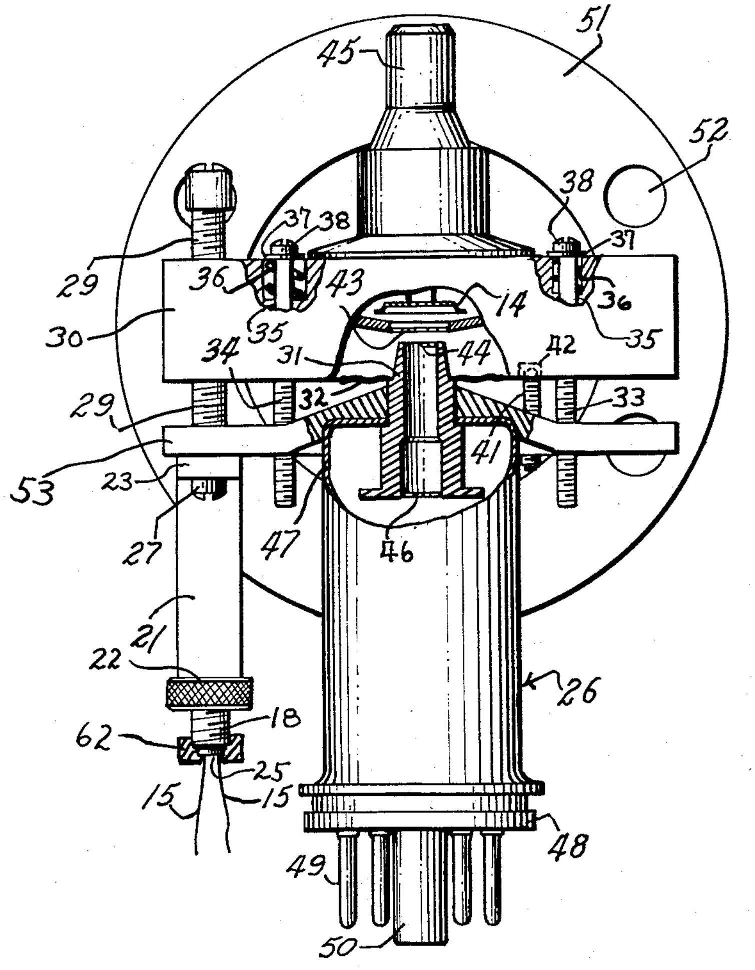
FIGURE 5 is a drawing of the pertinent portions of a klystron tube, showing the adjustable diaphragm and thermal control.

FIGURE 5 shows the compensator of FIG. 4 as attached to the klystron 26 with which it is to operate. A screw 27 is passed through each of the holes 24 in the top 23 of bracket 21, the screw fitting into threads in the klystron plate 53. In FIG. 5, the bracket 21 is shown in a position transverse to the section plane of FIG. 4. The locknut 22 secures the metal cylinder 18 to the bottom 20 of the metal bracket 21, the threaded bottom of said cylinder projecting therethrough, with a portion 25 of the lava spindle 17 projecting therethrough and held by the annular end cap 62, shown in section, the wires 15, 15 projecting through the open center of said annular cap.

The bottom 28 of adjustment screw 29 rests on the top of metal compensator cylinder 18. The adjustment screw 29 is fixed to the metal plate 30, which has a hollow central portion and is flexibly attached to the grid support 31 by the metal diaphragm 32 to act as partial boundaries of an evacuated chamber. Screws 33, 34 pass through cylindrical holes 35, 35 in solid portions of the chamber 30, without entering the evacuated hollow portion. The holes 35, 35 provide some clearance around the screws 33, 34 so that the chamber 30 can be moved axially with motion of the adjustment screw 29. The springs 36, 36 bear between washers 37, 37 under screw heads 38, 38 and the bottom of the counterbore 40 in the chamber 30. The washers 37, 37 can be either larger or smaller than the diameter of the counterbore 40, as shown; when they are smaller, the chamber 30 can move upward enough to encompass part of the screw head 38, if necessary. This enables the chamber 30 to tilt somewhat on the end of the additional alignment screw 41 as a flucrum, the latter screw entering the hole 42 in the material of the solid part of plate 30. Thus when the metal cylinder 18 is expanded by the heat produced by passage of current through wire 15, the screw 29 is pushed upward, carrying the plate 30 upward also. The klystron grid 43, being fixed to the plate 30, moves with it, while grid 44, being fixed to the plate 53 through the support 31, remains stationary. The distance between the two grids, 43, 44 can thus be varied, changing the characteristics of the device.

The reflector 14 is attached to the contact cap 45 in the usual manner, the cap being insulated from the plate 30. The hollow support 31 for grid 44 supports at its other end the accelerating grid 46, inside the hollow metal tube 47, which is fixed to the plate 53, at one end, and at its other end carries the base 48, with the usual centering pin 50 and contact pins 49, the latter being connected to lead-in wires passing through a glass insulating plate which seals off the bottom of metal tube 26 in the usual manner. Connected to these contact pins inside the tube 47, but not appearing in FIG. 5, is the usual cathode 54 or electron gun used in the klystron art.

The metal flange 51 is attached to the plate 30 and carries the usual mica window for conducting out the electromagnetic energy produced between the high frequency grids 43 and 44. The flange 51 may be bolted to a corresponding flange on a wave guide for leading the radiation to an antenna or the like, for example, in the circuit of FIG. 1.

The change in current through the heater 12 in FIG. 3 must be in the proper direction to accomplish the desired result. Thus the winding 9 is split into two parts **9*a* and 9*b*, so that an increase in current in the plate circuit will cause a decrease in the D.C. flux density of the saturable reactor 8. The entire coil 9 can be connected in the plate circuit by shifting the positive terminal of the plate voltage supply from the center tap 55 to the end 57 of the winding, if an additional amplifier tube is inserted between 1 and the reactor 8** to reverse the phase of the amplification.

A similar reversal of phase could be achieved with a single amplifier tube with the plate current flowing through the entire winding 9 by reversing the connections of the klystron reflector 14 and the klystron cathode 54 to the input of the amplifier. The winding 9 can also be connected, either directly or through a resistance or voltage divider, in the position marked "$\Delta E_R$" in FIG. 3, and the amplifier tube 1 eliminated, in cases where amplification other than that provided by the saturable reactor 8 is unnecessary.

Where amplification is unnecessary, the heater 12, if of sufficiently high resistance can be itself connected directly at the part of the circuit marked "$\Delta E_R$" and the amplifier eliminated.

Although the input of the amplifier tube is shown connected directly between the reflector 14 and cathode 54 of the klystron in FIG. 3, it can instead be connected across part of a voltage-dividing resistance, and the latter connected across the klystron. Various other modifications can be made.

Although for convenience the embodiment above is described with respect to its use in a repeater circuit, the embodiment is not limited to such circuits, but can be used generally in circuits in which the center frequency of the klystron range, that is the frequency in the absence of modulation, is maintained constant, or at a constant difference from a comparison frequency, by an automatic frequency control, which, when the klystron frequency tends to drift because of mechanical, thermal, or any other kind of drift in the tube, brings it back by changing the reflector voltage. The compensating arrangement then brings the reflector voltage back to its proper value at the center of the range by shifting one of the radio frequency grids, 43, 44. The time lag of the thermal means used for compensation insures that the automatic frequency control will act first, and insures also that the heater 12 will not respond to the instantaneous changes in frequency produced by the modulation.

Figure 6:
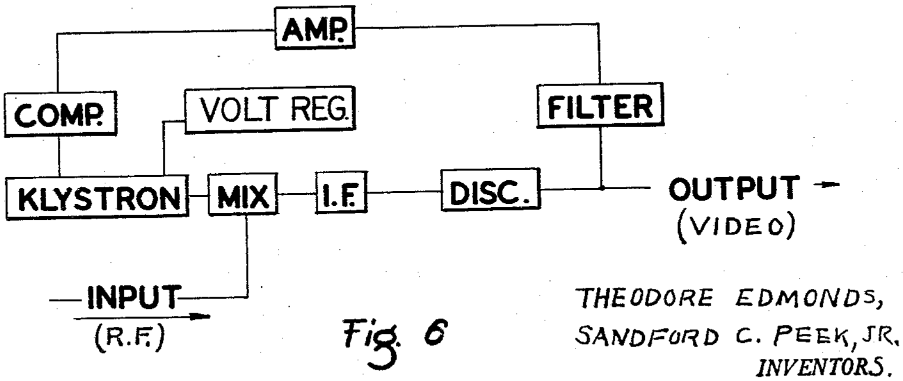
FIGURE 6 is a block diagram of an embodiment in which the thermal control device itself acts as an automatic frequency control.

In FIG. 6, however, a diagram is shown for a circuit in which the klystron reflector voltage is held constant by a voltage regulator, so that the latter is kept constant without appreciable hunting, and any change occurring will be in the frequency. A radio frequency discriminator is used on the klystron output to develop a change in voltage when the frequency changes, and this frequency-developed change in voltage, instead of the change $\Delta E_R$ in reflector voltage, is fed to the input of a servo-amplifier such as that of FIG. 3. The output voltage of the amplifier then causes current flow in the wires 15 of heater 12, expanding the cylinder 18 and shifting the spacing between grids 43 and 44 in the klystron until the frequency is brought back to its proper predetermined value.

In FIG. 6, a voltage regulator of a type well-known in the art is used on the klystron input to keep the center voltage of the klystron reflector constant within extremely narrow limits. A modulating voltage is then applied to the klystron input, the time constant of the voltage regulator being great enough to avoid interference with the rapid voltage changes used in modulating. The klystron output can then go to an antenna, or can be used as a local oscillator for heterodyning, or can be used in many other ways. A small part of the klystron output, however, is fed into a radio frequency discriminator, of a type known in the art, for example a pair of cavity resonators tuned a few megacycles off on opposite sides of the center frequency, with their outputs, after detection, in series-opposing relationship so that there is no controlling signal across them when the klystron is on frequency. The output from the discriminator, after having any radio frequency which may be present filtered out, is fed to a servo-amplifier such as that shown in FIG. 3, the discriminator output being fed to the input of the tube 1, that is across the position marked "$\Delta E_R$," with the connections to the repeller 14 and cathode 54 of the klystron, as well as the connection of the voltage V omitted. The polarity of the control voltage from the discriminator should be such as to cause the klystron grid 43 to be moved in the proper direction to keep the frequency constant.

In the circuit of FIG. 6, a compensator of smaller time constant than that used for the circuit of FIG. 1 is sometimes desirable, and the heater winding 12 of FIG. 2 can be replaced by an electro-magnet coil operating a suitable magnetostriction bar or strip, with one end of the bar or strip fixed to the stationary part of the klystron and the other end in contact with the adjustment screw 29, in place of the metal cylinder 18. The time constant of the circuit as a whole should still be high enough to avoid interference with the frequency modulation, however. This can be arranged by using suitable values of resistance 5 and capacity 6.

When the compensating unit of FIG. 4 is attached to the klystron plate 53, the full reflector voltage will appear between the metal cup 18 and the heater wires 15, if the power source 13 for the heater is the filament supply for the tubes. The insulation of the lava cup 16 and sleeve 17 should be capable of withstanding the reflector voltage, and is best reinforced with the mica pieces fitting between the lava cup 16 and spindle 17 and the metal shell. Alternatively, an insulating transformer can be placed between the heater wires 15 and the power source 13, the insulation then being reinforced by the added transformer. If the heater 12 is supplied from a source at a point of higher potential in the circuit than that of the tube filament supply, the added insulation should be unnecessary.

The electrode 14, generally referred to herein as a reflector can also be called a repeller.

To insure the greatest difference in expansion between the bracket 21 and the cylinder 18, the bracket 21 can be made of a material such as Invar having a low coefficient of expansion, and the cylinder 18 a material such as stainless steel of high coefficient of expansion. The stainless steel has the additional advantage of resistance to corrosion even when heated.

The output of the D.C. amplifier in FIG. 1 is represented in FIG. 3 by the resistance 61, and the mean reflector voltage supply by the battery 60, although in practice a regulated voltage supply is used instead of a battery.

What we claim is:

1. A control circuit for a klystron having two grids and a reflector, said circuit comprising automatic means for keeping the klystron frequency constant by shifting the reflector voltage from a predetermined value as the frequency tends to change, and means directly actuated by the shift in reflector voltage for bringing the reflector voltage back to said predetermined value by changing the spacing between the grids.

2. A control circuit for a klystron having two grids and a reflector, said circuit comprising means for receiving a high-frequency signal, means acting in response to said signal to maintain the klystron frequency at a constant difference from the signal frequency by shifting the reflector voltage from a predetermined value as the frequency tends to change, and automatic means directly actuated by the shift in reflector voltage to bring the reflector voltage back to said predetermined value by changing the spacing between the grids.

3. A control circuit for a klystron oscillator tube having two internal grids and a reflector, one of said grids being mounted on a diaphragm extending outside the tube so that the spacing between the grids can be varied from outside the tube, a tuning screw for moving the diaphragm, a compensator acting on one end of said tuning screw, means for heating said compensator to expand the same to vary the position of said screw, means for varying the temperature of said heater in response to a change of impedance in the heating circuit, and means for varying the impedance of said heating circuit in response to a change in the operating conditions of the tube.

4. A stabilizing circuit for a klystron oscillator tube having two grids and a reflector, one of said grids being mounted on a diaphragm extending outside the tube so that the spacing between the grids can be varied from outside the tube, a tuning screw for moving said diaphragm, a compensator acting on said tuning screw and fixed to said klystron, means for heating said compensator to expand the same and thereby move said tuning screw relative to the unexpanded position of said compensator, a voltage supply for said heater, saturable reactance coil in series with said voltage supply and said heater, a second coil on said reactor and in series with the plate circuit of a vacuum tube to vary the flux density in said coil in accordance with the current in said plate circuit flowing through said second coil, and means connected to the grid circuit of said vacuum tube and responsive to changes in the reflector voltage of said klystron.

References Cited in the file of this patent

UNITED STATES PATENTS

| | | |
|---|---|---|
| 2,276,822 | Bowman et al. | Mar. 17, 1942 |
| 2,434,293 | Stearns | Jan. 13, 1948 |
| 2,434,294 | Ginzton | Jan. 13, 1948 |
| 2,468,145 | Varian | Apr. 26, 1949 |
| 2,477,616 | Jaynes | Aug. 2, 1949 |
| 2,531,211 | Glass | Nov. 21, 1950 |
| 2,562,943 | Pensyl | Aug. 7, 1951 |